United States Patent Office

FRANK W. STERRY, OF MORRISANIA, NEW YORK.

*Letters Patent No. 60,955, dated January 1, 1867.*

---

IMPROVED COMPOUND FOR SWEETENING, COLORING, AND FLAVORING TOBACCO.

---

The Schedule referred to in these Letters Patent and making part of the same.

---

TO ALL WHOM IT MAY CONCERN:

Be it known that I, FRANK W. STERRY, of Morrisania, in the county of Westchester, and State of New York, have invented a new and improved Compound for Sweetening, Coloring, and Flavoring Tobacco; and I do hereby declare that the following is a full, clear, and exact description thereof, which will enable others skilled in the art to make and use the same.

This invention relates to a novel compound whereby fine cut or any other chewing tobacco is sweetened and colored without any dangerous ingredients.

The invention consists in so combining and compounding the powdered radix glycyrrhiza or licorice root, with the powdered extract of the same, which is commonly known under the application of paste (or calabria) licorice, and with powdered white sugar, that the aforesaid results will be obtained when the mixture of the three powders is spread over the tobacco. The aforesaid ingredients are compounded in about the following proportions, making 5 parts of weight, viz: powdered radix glycyrrhiza, 2 parts; powdered extract rad: glycyrrhiza, 1 part; powdered white sugar, 2 parts = 5 parts. Each of the ingredients is first passed through a mill, and is therein ground to a very fine powder. The three powders are then mixed and manipulated by passing through a mill or otherwise, so as to make the mixture more perfect and complete. Any other process for preparing and mixing the ingredients may be substituted for the one herein described. The paste licorice is not only too expensive, but it also colors too deep when moistened, to allow it to be used with the sugar alone. Therefore, I take only a small quantity of the same, and add the licorice root, which has the same flavor and strength almost as the paste licorice, but which is considerably cheaper and does not color as deep. The two licorices mixed in the aforesaid proportions have just the requisite color when moistened. The compound may be mixed with the tobacco, either when casing, *i. e.*, pressing the same, previous to cutting it, or after it has been cut. In the latter case the powder is spread over the tobacco by means of a sieve, the tobacco being still moist enough to retain a sufficient quantity of the powder.

Having thus described my invention, what I claim as new, and desire to secure by Letters Patent, is—

A compound for sweetening, flavoring, and coloring tobacco, which is made of the aforesaid ingredients, in about the proportions herein set forth.

The above specification of my invention signed by me this 21st day of November, 1866.

FRANK W. STERRY.

Witnesses:
   WM. F. McNAMARA,
   ALEX. F. ROBERTS.